(12) United States Patent
Kawai

(10) Patent No.: US 10,081,167 B2
(45) Date of Patent: Sep. 25, 2018

(54) ETHYLENE-VINYL ALCOHOL RESIN COMPOSITION, MULTILAYER STRUCTURE, MULTILAYER SHEET, CONTAINER AND PACKAGING MATERIAL

(71) Applicant: KURARAY CO., LTD., Kurashiki-shi (JP)

(72) Inventor: Hiroshi Kawai, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 243 days.

(21) Appl. No.: 15/026,418

(22) PCT Filed: Oct. 2, 2014

(86) PCT No.: PCT/JP2014/076442
§ 371 (c)(1),
(2) Date: Mar. 31, 2016

(87) PCT Pub. No.: WO2015/050224
PCT Pub. Date: Apr. 9, 2015

(65) Prior Publication Data
US 2016/0221314 A1   Aug. 4, 2016

(30) Foreign Application Priority Data

Oct. 2, 2013 (JP) ................................. 2013-207783
Oct. 2, 2013 (JP) ................................. 2013-207784

(51) Int. Cl.
| | |
|---|---|
| C08L 29/04 | (2006.01) |
| B32B 27/34 | (2006.01) |
| B32B 27/06 | (2006.01) |
| B32B 27/20 | (2006.01) |
| B32B 27/28 | (2006.01) |
| B32B 27/30 | (2006.01) |
| C08L 77/02 | (2006.01) |
| C08L 77/06 | (2006.01) |

(52) U.S. Cl.
CPC .............. *B32B 27/34* (2013.01); *B32B 27/06* (2013.01); *B32B 27/20* (2013.01); *B32B 27/288* (2013.01); *B32B 27/306* (2013.01); *C08L 29/04* (2013.01); *B32B 2264/105* (2013.01); *B32B 2270/00* (2013.01); *B32B 2439/00* (2013.01); *B32B 2439/70* (2013.01); *B32B 2553/00* (2013.01); *C08L 77/02* (2013.01); *C08L 77/06* (2013.01); *C08L 2201/08* (2013.01)

(58) Field of Classification Search
CPC .................................. C08K 5/07; C08L 29/04
See application file for complete search history.

(56) References Cited

FOREIGN PATENT DOCUMENTS

| | | |
|---|---|---|
| JP | 4 131237 | 5/1992 |
| JP | 5-179001 A | 7/1993 |
| JP | 6 23924 | 2/1994 |
| JP | 7-97491 A | 4/1995 |
| JP | 8 239528 | 9/1996 |
| JP | 9 71620 | 3/1997 |
| JP | 10 80981 | 3/1998 |
| JP | 2002 146135 | 5/2002 |
| JP | 2007 31725 | 2/2007 |
| JP | 2009 242645 | 10/2009 |
| JP | 2010 77352 | 4/2010 |
| JP | 2012 36341 | 2/2012 |
| WO | 2005 14716 A1 | 2/2005 |
| WO | 2013 187454 A1 | 12/2013 |

OTHER PUBLICATIONS

International Search Report dated Dec. 16, 2014, in PCT/JP2014/076442 Filed Oct. 2, 2014.
Extended European Search Report dated Apr. 6, 2017 in Patent Application No. 14851042.3.

*Primary Examiner* — Wenwen Cai
(74) *Attorney, Agent, or Firm* — Oblon, McClelland, Maier & Neustadt, L.L.P.

(57) ABSTRACT

A resin composition includes an ethylene-vinyl alcohol copolymer (A) having an ethylene content of 20 to 60 mol %, a polyamide (B), a carboxylic acid metal salt (C), and a saturated carbonyl compound (D) having 3 to 8 carbon atoms. The saturated carbonyl compound (D) is a saturated aldehyde, a saturated ketone, or a combination thereof. The mass ratio (A/B) of the ethylene-vinyl alcohol copolymer (A) to the polyamide (B) is 60/40 to 95/5. The content of the carboxylic acid metal salt (C) expressed as a mass of a metal element with respect to the resin content is 1 to 500 ppm. The content of the saturated carbonyl compound (D) with respect to the resin content is 0.01 ppm to 100 ppm.

13 Claims, No Drawings

ETHYLENE-VINYL ALCOHOL RESIN COMPOSITION, MULTILAYER STRUCTURE, MULTILAYER SHEET, CONTAINER AND PACKAGING MATERIAL

TECHNICAL FIELD

The present invention relates to a resin composition containing an ethylene-vinyl alcohol copolymer, a polyamide, a carboxylic acid metal salt and a saturated aldehyde, a multilayer structure and a multilayer sheet including the resin composition, and a container and a packaging material including the multilayer sheet.

BACKGROUND ART

Ethylene-vinyl alcohol copolymers (hereinafter, may be abbreviated as "EVOH(s)") are useful polymeric materials that are superior in barrier properties against various types of gases such as oxygen, oil resistance, antistatic properties, mechanical strength and the like; therefore, EVOHs are formed into films, sheets, and the like, and widely used as various types of packaging materials, containers, etc. In particular, laminates constituted with an EVOH layer and other thermoplastic resin layer are known to be useful as packaging materials for boiling sterilization or retort sterilization of foods.

However, when the laminates are subjected to generally employed boiling or retorting sterilization using hot water, water penetrates into the EVOH layer during the processing, leading to deterioration of mechanical properties of the EVOH layer. As a method for an improvement of the mechanical properties, blending the EVOH with a polyamide (hereinafter, may be abbreviated as "PA") having superior hot water resistance has been conventionally employed (hereinafter, suitability for such boiling sterilization or retorting sterilization may be also referred to as "retort resistance"). In these days, as a method for further improving the retort resistance, the following methods have been developed: a method involving laminating a layer formed from a resin composition having the mass ratio of EVOH/PA of 55/45 or more and 97/3 or less as an outermost layer, and a layer formed from a thermoplastic resin having low moisture permeability as an inner layer (see Japanese Unexamined Patent Application, Publication No. H10-80981); a method involving incorporating a metal compound and/or a boric acid compound into an intermediate layer formed from a composition containing EVOH and a PA (see Japanese Unexamined Patent Application, Publication No. H4-131237); and a method involving forming an intermediate layer from a composition containing two types of EVOHs and PA (see Japanese Unexamined Patent Application, Publication No. H6-23924).

In the conventional resin compositions containing EVOH and PA, the retort resistance has been improved. However, a crosslinking reaction may proceed between a hydroxyl group or a terminal carboxyl group of the EVOH and an amide group, a terminal amino group or a terminal carboxyl group of the PA, leading to nonuniformity of a resin viscosity, and resulting in significant generation of burnt deposits within an extruder, a screw and a die during melt molding over a long time period, and the like.

Such burnt deposits generated within the extruder, the screw and the die may remain therein for a certain time period and thereafter contaminate formed articles during a continuous operation over a long time period. The burnt deposits thus contaminating the formed articles not only deteriorate an appearance, but also cause defects to be formed, resulting in deterioration of various mechanical properties. Typically, in order to prevent the burnt deposits from contaminating formed articles, it is necessary to periodically shut down the operation and to carry out disassembly for cleaning of a line of extrusion equipment. However, an increase of the frequency of this procedure leads to not only an increase in production costs, but also consumption of materials required for the shutdown and restarting as well as a loss of production time; therefore, improvements have been desired in light of both resources and costs.

As described in the foregoing, it is difficult to improve the retort resistance of the resin composition and additionally preclude a cost increase and the unfavorable appearance due to burnt deposits formed in an operation over a long time period based on the conventional techniques. Additionally, the odor in molding must be taken into consideration from an environmental viewpoint.

PRIOR ART DOCUMENTS

Patent Documents

Patent Document 1: Japanese Unexamined Patent Application, Publication No. H10-80981
Patent Document 2: Japanese Unexamined Patent Application, Publication No. H4-131237
Patent Document 3: Japanese Unexamined Patent Application, Publication No. H6-23924
Patent Document 4: Japanese Unexamined Patent Application, Publication No. 2007-31725

SUMMARY OF THE INVENTION

Problems to be Solved by the Invention

The present invention was made in view of the foregoing circumstances, and an objective of the invention is to provide a resin composition that is superior in retort resistance as well as inhibitory effects on the odor and generation of burnt deposits in an operation over a long time period.

Means for Solving the Problems

According to an aspect of the invention made for solving the aforementioned problems, a resin composition contains: an ethylene-vinyl alcohol copolymer (A) having an ethylene content of 20 mol % or greater and 60 mol % or less; a polyamide (B); a carboxylic acid metal salt (C); and a saturated carbonyl compound (D) having 3 to 8 carbon atoms, wherein the saturated carbonyl compound (D) is a saturated aldehyde (D-1), a saturated ketone (D-2) or a combination thereof, the mass ratio (A/B) of the ethylene-vinyl alcohol copolymer (A) to the polyamide (B) is 60/40 or greater and 95/5 or less, the content of the carboxylic acid metal salt (C) with respect to the resin content in terms of metal element equivalent is 1 ppm or greater and 500 ppm or less, and the content of the saturated carbonyl compound (D) with respect to the resin content is 0.01 ppm or greater and 100 ppm or less.

Due to containing the components (A) to (D), and to making the ratio of the ethylene-vinyl alcohol copolymer (A) to the polyamide (B), the content of the carboxylic acid metal salt (C), as well as the content of the saturated carbonyl compound (D) each fall within the specified range, the resin composition is superior in retort resistance as well as an inhibitory effects on an odor and generation of burnt deposits in an operation over a long time period. Although reasons for the achievement of the aforementioned effects by the resin composition are not necessarily clear, it can be presumed, for example, that since the ethylene-vinyl alcohol copolymer (A), the polyamide (B) that improves hot water resistance, the carboxylic acid metal salt (C) that inhibits the occurrence of gelation in an operation over a long time period, and the saturated carbonyl compound (D) that inhibits the generation of burnt deposits within a molding machine in an operation over a long time period are each contained in the specified amount, the effects exerted by containing each component can be synergistically exhibited, and consequently the generation of burnt deposits within the molding machine in an operation over a long time period can be effectively inhibited while the retort resistance is maintained or improved, whereby an extension of a time period for continuous operation for the production is enabled.

The content of the carboxylic acid metal salt (C) with respect to the resin content in terms of metal element equivalent is preferably 5 ppm or greater. According to the resin composition, when the content of the carboxylic acid metal salt (C) falls within the specified range, the occurrence of gelation in an operation over a long time period can be further inhibited, and consequently the generation of burnt deposits in the operation over a long time period can be further inhibited, whereby the retort resistance and the appearance characteristics can be more improved.

A metal element in the carboxylic acid metal salt (C) is preferably magnesium, calcium, zinc or a combination thereof. When the carboxylic acid metal salt (C) is thus a carboxylic acid metal salt of the specified metal element, the occurrence of gelation in an operation over a long time period can be further inhibited, and as a result, further inhibition of the generation of burnt deposits and a further improvement of the retort resistance are enabled.

The saturated aldehyde (D-1) is preferably propanal, butanal, hexanal or a combination thereof. The saturated ketone (D-2) is preferably acetone, methyl ethyl ketone, 2 hexanone or a combination thereof. When the specified saturated carbonyl compound is used as the saturated carbonyl compound (D), the retort resistance and the inhibitory effects on the generation of burnt deposits described above can be further improved.

According to another aspect of the present invention, a multilayer structure includes a barrier layer formed from the resin composition according to the aspect of the present invention, and a thermoplastic resin layer laminated on at least one face of the barrier layer. Moreover, according to still another aspect of the present invention, a multilayer sheet includes the multilayer structure according to the another aspect of the present invention. Due to including the barrier layer formed from the resin composition exhibiting the aforementioned characteristics and the thermoplastic resin layer, the multilayer structure and the multilayer sheet exhibit superior appearance characteristics, retort resistance and processability.

The barrier layer and the thermoplastic resin layer are preferably laminated by a coextrusion molding process. When the two types of layers are laminated by the coextrusion molding process, the multilayer sheet can be easily and reliably produced, and as a result, the superior appearance characteristics, retort resistance and processing characteristics described above can be effectively achieved.

According to yet still another aspect of the present invention, a container formed from the multilayer sheet according to another aspect of the present invention by a vacuum/pressure forming process is provided. Since the container is obtained through the forming of the aforementioned multilayer sheet by the vacuum/pressure forming process, the container can be easily and reliably produced, and consequently exhibits superior appearance characteristics and retort resistance.

The container is preferably for use in boiling sterilization or retort sterilization. Since the resin composition exhibiting the aforementioned properties is used, the container can be suitably used in the aforementioned intended usages.

According to even yet another aspect of the present invention, a packaging material formed from the multilayer sheet by a heat-stretching process is provided. The packaging material can be easily and reliably produced through forming from the aforementioned multilayer sheet by the heat-stretching process, and consequently the packaging material formed from the stretched multilayer sheet exhibits superior appearance characteristics, and additionally exhibits inhibited occurrence of the unevenness in drawing.

The "resin content" as referred to herein means the entire resin component including the EVOH (A), the PA (B), and other resin that may be contained as an optional component as described later.

Effects of the Invention

As explained in the foregoing, according to the aspect of the present invention, a resin composition is provided that is superior in retort resistance as well as inhibitory effects on an odor and generation of burnt deposits in an operation over a long time period. The multilayer structure and the multilayer sheet according to the aspects of the present invention exhibit superior appearance characteristics, retort resistance and processing characteristics. The container according to the still another aspect of the present invention exhibits superior appearance characteristics and retort resistance. The packaging material according to the yet another aspect of the present invention exhibits superior appearance characteristics, and inhibited occurrence of the unevenness in drawing. Therefore, the resin composition, the multilayer structure, the multilayer sheet, the container and the packaging material are suitable for various types of packaging materials for use in boiling sterilization or retort sterilization, etc.

DESCRIPTION OF EMBODIMENTS

Hereinafter, embodiments of the present invention will be described. However, the present invention is by no means limited to the following embodiments. In addition, with respect to materials exemplified in the following, one type of the materials may be used alone, or two or more types thereof may be used in combination, unless otherwise specified particularly.

Resin Composition

The resin composition according to an embodiment of the present invention contains (A) EVOH, (B) PA, (C) a carboxylic acid metal salt and (D) a saturated carbonyl compound. The resin composition may contain an optional component such as a boron compound, a conjugated polyene compound, an acetic acid compound and a phosphorus compound, within a range not leading to impairment of the effects of the present invention. Hereinafter, each component will be described.

EVOH (A)

EVOH (A) is an ethylene-vinyl alcohol copolymer obtained by saponifying a copolymer of ethylene and a vinyl ester.

The vinyl ester is exemplified by vinyl acetate, vinyl propionate, vinyl pivalate, and the like, and vinyl acetate is preferred. These vinyl esters may be used either alone, or two or more types thereof may be used in combination.

The EVOH (A) may have other structural unit derived from a monomer other than ethylene and the vinyl ester. Such a monomer is exemplified by polymerizable compounds, e.g.: vinylsilane compounds; unsaturated hydrocarbons such as propylene and butylene; unsaturated carboxylic acids such as (meth)acrylic acid; vinylpyrrolidones such as N-vinylpyrrolidone; and the like. The content of the other structural unit is preferably 0.0002 mol % or greater and 0.2 mol % or less with respect to the total structural units of the EVOH (A).

The ethylene content of the EVOH (A) is 20 mol % or greater and 60 mol % or less. The lower limit of the ethylene content is preferably 24 mol %, and more preferably 27 mol %. The upper limit of the ethylene content is preferably 55 mol %, more preferably 45 mol %, still more preferably 42 mol %, and particularly preferably 38 mol %. When the ethylene content is less than the lower limit, thermal stability in the melt extrusion may be deteriorated, leading to ease of gelation, and consequently defects such as streaks and fish eyes are likely to be generated. In particular, when an operation is made over a long time period under conditions involving a higher temperature or a higher speed than those for general melt extrusion, the gelation is highly likely to occur. On the other hand, when the ethylene content is greater than the upper limit, the gas barrier properties and the like may be deteriorated, and the advantageous characteristics of the EVOH may not be sufficiently exhibited.

The degree of saponification of the structural unit derived from the vinyl ester in the EVOH (A) is typically 85% or greater, preferably 90% or greater, more preferably 98% or greater, and still more preferably 99% or greater. When the degree of saponification is less than 85%, insufficient thermal stability may be caused.

PA (B)

The PA (B) is a resin that includes an amide linkage. The PA (B) is obtained by: ring-opening polymerization of a lactam having a 3 or more-membered ring; polycondensation of a polymerizable ω-amino acid; polycondensation of a dibasic acid and a diamine; and the like.

In the PA (B), a substituted aliphatic diamine such as 2,2,4- and 2,4,4-trimethylhexamethylenediamines, an aromatic amine such as methylbenzylamine and meta-xylylenediamine, or the like may be used as the diamine, and a modification of a polyamide with the amine may be made. Furthermore, a substituted aliphatic carboxylic acid such as 2,2,4- and 2,4,4-trimethyladipic acids, an alicyclic dicarboxylic acid such as 1,4-cyclohexanedicarboxylic acid, an aromatic dicarboxylic acid such as phthalic acid, xylylenedicarboxylic acid, alkyl-substituted terephthalic acid, alkyl-substituted isophthalic acid and naphthalenedicarboxylic acid, or the like may be used as the dicarboxylic acid, and a modification of a polyamide with the dicarboxylic acid may be made.

Examples of the PA (B) include polycaproamide (nylon 6), poly-ω-aminoheptanoic acid (nylon 7), poly-ω-aminononanoic acid (nylon 9), polyundecanamide (nylon 11), polylauryllactam (nylon 12), polyethylenediamine adipamide (nylon 26), polytetramethylene adipamide (nylon 46), polyhexamethylene adipamide (nylon 66), polyhexamethylene sebacamide (nylon 610), polyhexamethylene dodecamide (nylon 612), polyoctamethylene adipamide (nylon 86), polydecamethylene adipamide (nylon 106), caprolactam/lauryllactam copolymers (nylon 6/12), caprolactam/ω-aminononanoic acid copolymers (nylon 6/9), caprolactam/hexamethylenediammonium adipate copolymers (nylon 6/66), lauryllactam/hexamethylenediammonium adipate copolymers (nylon 12/66), hexamethylenediammonium adipate/hexamethylenediammonium sebacate copolymers (nylon 66/610), ethylene diammonium adipate/hexamethylenediammonium adipate copolymers (nylon 26/66), caprolactam/hexamethylenediammonium adipate/hexamethylenediammonium sebacate copolymers (nylon 6/66/610), polyhexamethylene isophthalamide (nylon 6I), polyhexamethylene terephthalamide (nylon 6T), hexamethylene isophthalamide/terephthalamide copolymers (nylon 6I/6T), and the like. These PAs (B) may be used alone or as a mixture of two or more types thereof.

Among these PAs (B), polycaproamide (nylon 6) and caprolactam/lauryllactam copolymers (nylon 6/12) are preferred. The ratio of the nylon 6 unit and the nylon 12 unit is not particularly limited, and the percentage content of the nylon 12 unit is preferably 5% by mass or greater and 60% by mass or less, and more preferably 5% by mass or greater and 50% by mass or less.

In regard to the ratio of the EVOH (A) and the PA (B) contained in the resin composition, the lower limit of the mass ratio of the EVOH (A) to the PA (B) is 60/40, preferably 65/35, more preferably 70/30, and particularly preferably 75/25. Moreover, the upper limit of the mass ratio is 95/5, preferably 90/10, and more preferably 85/15. When the mass ratio is less than the lower limit, characteristics such as gas barrier properties against various types of gases and oil resistance each inherently exhibited by the EVOH (A) may be deteriorated. To the contrary, when the mass ratio is greater than the upper limit, the retort resistance of the resin composition may be deteriorated.

The total mass of the EVOH (A) and the PA (B) with respect to the resin content in the resin composition is preferably 80% by mass or greater, more preferably 90% by mass or greater, still more preferably 95% by mass or greater, and particularly preferably 100% by mass.

Carboxylic Acid Metal Salt (C)

The resin composition contains the carboxylic acid metal salt (C). Due to containing the carboxylic acid metal salt (C), the resin composition can inhibit the occurrence of gelation in an operation over a long time period.

A metal element in the carboxylic acid metal salt (C) is not particularly limited. In light of inhibitory effects on the gelation, the metal element is exemplified by metal elements that give a divalent metal salt, such as lithium, sodium, potassium, magnesium, calcium, zinc and copper. Of these, magnesium, calcium, zinc or a combination thereof is preferred.

An anion in the carboxylic acid metal salt (C) is not particularly limited as long as it is a carboxylic acid anion, and is exemplified by an anion of carboxylic acid such as formic acid, acetic acid, propionic acid, butyric acid, valeric acid, caproic acid, heptanoic acid, octanoic acid, nonanoic acid, decanoic acid, undecanoic acid, dodecanoic acid, stearic acid, dimethyldithiocarbamic acid, palmitic acid, 2-ethylhexanoic acid, neodecanoic acid, linoleic acid, tallic acid, oleic acid, capric acid, naphthenic acid or sorbic acid, and the like.

The carboxylic acid that gives the carboxylic acid anion is preferably a carboxylic acid having 1 to 26 carbon atoms, more preferably carboxylic acid having 1 to 12 carbon atoms, still more preferably carboxylic acid having 1 to 9 carbon atoms, and particularly preferably acetic acid or sorbic acid.

The lower limit of the content of the carboxylic acid metal salt (C) with respect to the resin content in terms of metal element equivalent is 1 ppm, preferably 3 ppm, more preferably 5 ppm, and still more preferably 10 ppm. The upper limit of the content of the carboxylic acid metal salt (C) in terms of metal element equivalent is 500 ppm, preferably 350 ppm, more preferably 200 ppm, and still more preferably 150 ppm. When the content is less than the lower limit, the resin composition may exhibit insufficient inhibitory effects on the gelation in an operation over a long time period. When the content is greater than the upper limit, coloring of the resin composition may be significant, and/or deterioration through degradation reactions may be accelerated, leading to a failure to obtain a resin composition having an adequate melt viscosity; as a result, the appearance characteristics of the resulting formed product may be deteriorated, and it may be difficult to obtain a desired formed product. The content of the carboxylic acid metal salt (C) in the resin composition as referred to herein means a proportion with respect to the resin content in the resin composition, i.e. a proportion by mass in terms of metal element equivalent with respect to the total mass of the resin component, and more specifically, a proportion with respect to the resin content in a dried resin composition. In the resin composition, the carboxylic acid metal salt (C) may be used either alone, or in combination of two or more types thereof.

Saturated Carbonyl Compound (D)

Since the resin composition according to the embodiment of the present invention contains the saturated carbonyl compound (D), the resin composition can effectively inhibit the generation of burnt deposits within a molding machine in an operation over a long time period, thereby enabling formed products exhibiting superior appearance characteristics, retort resistance and mechanical strength to be produced.

The saturated carbonyl compound (D) is any one of a saturated aldehyde (D-1) and a saturated ketone (D-2), or a combination thereof. The "saturated carbonyl compound (D)" as referred to herein means a compound that does not include an unsaturated bond in the moiety other than the carbonyl group.

The saturated aldehyde (D-1) may be a linear aldehyde, a branched aldehyde, or an aldehyde having a ring structure in a molecule thereof as long as the saturated aldehyde (D-1) does not include an unsaturated bond in the moiety other than the aldehyde group. The saturated aldehyde (D-1) may have one, or two or more aldehyde groups in a molecule thereof. The saturated aldehyde (D-1) is exemplified by a saturated aliphatic aldehyde and the like.

Examples of the saturated aliphatic aldehyde include propanal, butanal, pentanal, hexanal, heptanal, octanal, cyclohexanecarbaldehyde, cyclopentanecarbaldehyde, methylcyclohexanecarbaldehyde, methylcyclopentylaldehyde, and the like.

The saturated ketone (D-2) may be a linear ketone, a branched ketone, or a ketone having a ring structure in a molecule as long as the saturated ketone (D-2) does not include an unsaturated bond in the moiety other than the carbonyl group. The saturated ketone (D-2) may have one, or two or more carbonyl groups in a molecule thereof. The saturated ketone (D-2) is exemplified by a saturated aliphatic ketone, a saturated cyclic ketone, and the like.

Examples of the saturated aliphatic ketone include acetone, methyl ethyl ketone, 2-pentanone, 3-pentanone, 3-methyl-2-butanone, 2-hexanone, 3-hexanone, 4-methyl-2-pentanone, 2-methyl-3-pentanone, 3,3-dimethyl-2-butanone, 2-heptanone, 3-heptanone, 4-heptanone, 4-methyl-2-hexanone, 5-methyl-2-hexanone, 2,4-dimethyl-3-pentanone, 2-octanone, 3 methyl-2-heptanone, 5-methyl-3-heptanone, 3-octanone, 6-methyl-2-heptanone, methyl cyclopentyl ketone, methyl cyclohexyl ketone, and the like. Examples of the saturated cyclic ketone include cyclobutanone, cyclopentanone, cyclohexanone, cycloheptanone, cyclooctanone, and the like.

In light of an improvement of the solubility of the saturated carbonyl compound (D) in water, the number of carbon atoms of the saturated carbonyl compound (D) is preferably 3 to 50, more preferably 3 to 15, and still more preferably 3 to 8. In light of the inhibition of the coloring and the generation of the defects due to the melt molding, and an improvement of the long-run workability, the saturated aldehyde (D-1) is preferably propanal, butanal, hexanal or a combination thereof, and more preferably propanal, among the saturated aldehydes exemplified.

In light of the inhibition of the coloring and the generation of the defects due to the melt molding, and an improvement of the long-run workability, the saturated ketone (D-2) is preferably the saturated aliphatic ketone, more preferably acetone, methyl ethyl ketone, 2-hexanone or a combination thereof, and still more preferably acetone, among the saturated ketones exemplified.

A part or all of hydrogen atoms included in the saturated carbonyl compound (D) (except for the hydrogen atom of the aldehyde group of the saturated aldehyde (D-1)) may be substituted with a substituent, within a range not leading to impairment of the effects of the present invention. The substituent is exemplified by a halogen atom, a hydroxy group, an amino group, an amide group, a cyano group, and the like.

The lower limit of the content of the saturated carbonyl compound (D) with respect to the resin content is 0.01 ppm, preferably 0.05 ppm, and more preferably 0.1 ppm. Moreover, the upper limit of the content of the saturated carbonyl compound (D) with respect to the resin content is 100 ppm, preferably 95 ppm, and more preferably 50 ppm. When the content is less than the lower limit, the inhibition of the generation of burnt deposits within the molding machine may be insufficient. When the content is greater than the upper limit, in melt molding, the resin composition may be cross-linked owing to the saturated carbonyl compound (D), leading to the occurrence of gelation, and the coloring is likely to occur. The content of the saturated carbonyl compound (D) in the resin composition as referred to herein means a proportion with respect to the resin content in the resin composition, i.e., a proportion by mass with respect to the total mass in the resin component, and more specifically, a proportion of the saturated carbonyl compound (D) with respect to the resin content in a dried resin composition.

Optional Component

Boron Compound

The boron compound inhibits gelation in the melt molding, and additionally inhibits a torque fluctuation of an extrusion molding machine or the like, i.e., a variation of a viscosity during heating. Examples of the boron compound include boric acids such as orthoboric acid, metaboric acid and tetraboric acid; boric acid esters such as triethyl borate and trimethyl borate; boric acid salts such as alkali metal salts and alkaline earth metal salts of the aforementioned boric acids, and borax; boron hydrides; and the like. Of these, boric acids are preferred, and orthoboric acid is more preferred. The lower limit of the content of the boron compound in the resin composition is preferably 100 ppm. The upper limit of the content of the boron compound is preferably 5,000 ppm. When the content of the boron compound is less than the lower limit, a torque fluctuation of an extrusion molding machine or the like may not be sufficiently inhibited. On the other hand, when the content of the boron compound is greater than the upper limit, gelation is likely to occur during the melt molding, and consequently the appearance of the formed article may be deteriorated.

Conjugated Polyene Compound

The conjugated polyene compound inhibits oxidative degradation in melt molding. The "conjugated polyene compound" as referred to herein means a compound having a conjugated double bond, as generally referred to, i.e., a compound having two or more carbon-carbon double bonds and a structure in which a carbon-carbon double bond and a carbon-carbon single bond are alternately connected. The conjugated polyene compound may be a conjugated diene including two double bonds involved in the conjugation, a conjugated triene including three double bonds involved in the conjugation, or a conjugated polyene including four or more double bonds involved in the conjugation. In addition, the conjugated double bond may be present in a multiple number in a single molecule without being conjugated with one another. For example, compounds having three conjugated triene structures in a single molecule, such as tung oil, may also be included in the conjugated polyene compound.

The conjugated polyene compound preferably has 7 or less conjugated double bonds. When the resin composition contains a conjugated polyene compound having 8 or more conjugated double bonds, the coloring of the formed article is highly likely to occur.

The conjugated polyene compound may be used either alone, or two or more types thereof may be used in combination. The conjugated polyene compound has preferably 4 to 30 carbon atoms, and more preferably 4 to 10 carbon atoms. The conjugated polyene compound is preferably a sorbic acid ester, myrcene or a combination thereof.

The molecular weight of the conjugated polyene compound is preferably 1,000 or less. When the molecular weight of the conjugated polyene compound is greater than 1,000, the state of dispersion of the conjugated polyene compound in the EVOH (A) may be inferior, and the appearance after the melt molding may be unfavorable. The lower limit of the content of the conjugated polyene compound in the resin composition is preferably 0.01 ppm, and the upper limit of the content is preferably 1,000 ppm. When the content of the conjugated polyene compound is less than the lower limit, the inhibitory effects on oxidative degradation in the melt molding may not be sufficiently achieved. On the other hand, when the content of the conjugated polyene compound is greater than the upper limit, the gelation of the resin composition may be facilitated.

Japanese Unexamined Patent Application, Publication No. H9-71620 discloses that when the conjugated polyene compound is added in a step following the polymerization step, a resin composition containing less gelled matter generated in molding can be obtained; however, in the present invention, since the saturated carbonyl compound (D) is also added in addition to the conjugated polyene compound, the coloring and the generation of the defects such as fish eye can be further inhibited, leading to an improvement of the appearance characteristics of the formed products, and additionally a resin composition also exhibiting superior long-run workability can be obtained.

Acetic Acid

Acetic acid prevents the coloring of the formed article, and additionally inhibits gelation during melt molding. The lower limit of the content of acetic acid in the resin composition is preferably 50 ppm, more preferably 100 ppm, still more preferably 150 ppm, and particularly preferably 200 ppm. The upper limit of the content of acetic acid is preferably 1,000 ppm, more preferably 500 ppm, and still more preferably 400 ppm. When the content of acetic acid is less than the lower limit, sufficient coloring preventive effects may not be achieved, and yellowing of the formed article may occur. On the other hand, the content of acetic acid is greater than the upper limit, gelation is likely to occur in the melt molding, in particular, in melt molding over a long time period, and consequently the appearance of the formed article may be deteriorated.

Phosphorus Compound

The phosphorus compound inhibits the coloring and the generation of defects such as streaks and fish eyes, and additionally improves the long-run workability. Examples of the phosphorus compound include various types of phosphoric acids such as phosphoric acid and phosphorous acid, phosphates, and the like. The phosphate may be in any form of a monobasic phosphate salt, a dibasic phosphate salt and a tribasic phosphate salt. In addition, the cationic species contained in the phosphate is not particularly limited, and alkali metal salts and alkaline earth metal salts are preferred. Of these, sodium dihydrogen phosphate, potassium dihydrogen phosphate, disodium hydrogen phosphate and dipotassium hydrogen phosphate are more preferred, and sodium dihydrogen phosphate and dipotassium hydrogen phosphate are still more preferred. The lower limit of the content of the phosphorus compound in the resin composition is preferably 1 ppm. The upper limit of the content of the phosphorus compound is preferably 200 ppm. When the content of the phosphorus compound is less than the lower limit, or when the content of the phosphorus compound is greater than the upper limit, the thermal stability may be deteriorated, and the coloring and the occurrence of gelation are likely to occur in the melt molding over a long time period.

Other Optional Component

The resin composition may contain other optional component, within a range not leading to impairment of the effects of the present invention. The other optional component is exemplified by an alkali metal, an antioxidant, an UV absorbent, a plasticizer, an antistatic agent, a lubricant, a colorant, a filler, a heat stabilizer, other resin, and the like. The resin composition may contain two or more types of these optional components, and the total content of the optional component is preferably 1% by mass or less with respect to the resin composition.

Examples of the alkali metal include lithium, sodium, potassium, and the like. The lower limit of the content of the alkali metal in the resin composition is preferably 20 ppm, and more preferably 50 ppm. The upper limit of the content is preferably 1,000 ppm, and more preferably 500 ppm.

It is to be noted that in order to inhibit the gelation, for example, a hindered phenol compound, a hindered amine compound, a hydrotalcite compound or the like may be added. These may be used either alone, or two or more types thereof may be used in combination. The amount of the compound added to inhibit the gelation is typically 0.01% by mass or greater and 1% by mass or less.

Production Method of Resin Composition

The production method of the resin composition is not particularly limited as long as the EVOH (A), the PA (B), the carboxylic acid metal salt (C) and the saturated carbonyl compound (D) can be homogeneously blended. The EVOH (A) can be obtained, for example, by a production method including the steps of: copolymerizing ethylene with a vinyl ester (hereinafter, may be also referred to as "step (1)"); and saponifying the copolymer obtained in the step (1) (hereinafter, may be also referred to as "step (2)").

The procedure for incorporating the specified amount of the saturated carbonyl compound (D) into the resin composition is not particularly limited, and is exemplified by: a procedure in which the specified amount of the saturated carbonyl compound (D) is added in the step (1); a procedure in which the specified amount of the saturated carbonyl compound (D) is added in the step (2); a procedure in which the specified amount of the saturated carbonyl compound (D) is added to the EVOH (A) obtained in the step (2); and the like.

However, when the procedure in which the specified amount of the saturated carbonyl compound (D) is added in the step (1), or the procedure in which the specified amount of the saturated carbonyl compound (D) is added in the step (2) is employed, in order to incorporate a desired amount of the saturated carbonyl compound (D) into the resulting resin composition, it is necessary to increase the amount of the saturated carbonyl compound (D) added taking into consideration the amount of the saturated carbonyl compound (D) consumed in the polymerization reaction in the step (1) or the saponification reaction in the step (2). However, a too large amount of the saturated carbonyl compound (D) may inhibit these reactions. Moreover, since the amount of the saturated carbonyl compound (D) consumed may vary depending on the conditions of the polymerization reaction in the step (1) and/or the saponification reaction in the step (2), it would be difficult to regulate the content of the saturated carbonyl compound (D) in the resin composition. Therefore, a procedure in which later than the step (2), the specified amount of the saturated carbonyl compound (D) is added to the EVOH (A) obtained in the step (2) is preferred.

The procedure for adding the specified amount of the saturated carbonyl compound (D) to the resin is exemplified by: a procedure in which a blend of the saturated carbonyl compound (D) with the resin prepared beforehand is pelletized; a procedure in which a strand obtained by the deposition after the saponification of the ethylene-vinyl ester copolymer is impregnated with the saturated carbonyl compound (D); a procedure in which a strand obtained by deposition is impregnated with the saturated carbonyl compound (D) after cutting the strand; a procedure in which the saturated carbonyl compound (D) is added to a solution of redissolved chips of a dry resin composition; a procedure in which the resin and the saturated carbonyl compound (D) are melt knead; a procedure in which the saturated carbonyl compound (D) is fed to be contained in a melt of the resin during the extrusion; a procedure in which a masterbatch is produced by blending a high concentration of the saturated carbonyl compound (D) with a part of the resin and pelletizing the blend, and the masterbatch is dry-blended with the resin to give a mixture which is then melt-kneaded; and the like.

Of these, in light of a possibility of homogeneously dispersing a slight amount of the saturated carbonyl compound (D) in the resin, the procedure in which a blend of the saturated carbonyl compound (D) with the resin prepared beforehand is pelletized is preferred as the procedure for adding the saturated carbonyl compound (D). Specifically, the addition of the saturated carbonyl compound (D) is preferably carried out by adding the saturated carbonyl compound (D) to a solution prepared by dissolving the resin in a good solvent such as a mixed solvent of water and methanol, and extruding thus resulting mixture solution into a poor solvent through a nozzle or the like to permit deposition and coagulation, followed by washing and drying the same. In this procedure, the resin composition is obtained in the form of pellets in which the saturated carbonyl compound (D) is homogeneously mixed with the resin.

The procedure for incorporating each component other than the saturated carbonyl compound (D) into the resin composition is exemplified by: a procedure in which the pellets are mixed with each component, followed by melt-kneading; a procedure in which each component is mixed together with the saturated carbonyl compound (D) in preparing the pellets; a procedure in which the pellets are immersed in a solution containing each component; and the like. It is to be noted that a ribbon blender, a high speed mixer, a cokneader, a mixing roll, an extruder, an intensive mixer and the like may be employed for mixing the pellets and other component(s).

Formed Product

The formed product according to another embodiment of the present invention can be formed from the resin composition described above. The formed product is exemplified by a film, a sheet, a container, a pipe, a hose, a fiber, a packaging material, and the like. The "film" as referred to herein means a formed product typically having a thickness of less than 300 μm, whereas the "sheet" as referred to means a formed product typically having a thickness of 300 μm or greater. The formed product may be formed, for example, by melt molding, and a secondary forming processing as needed. Examples of the method for the melt molding include extrusion molding, inflation extrusion, blow molding, melt spinning, injection molding, injection blow molding, and the like. The melt molding temperature may vary depending on the melting point of the EVOH (A), and the like, and is preferably about 150° C. or greater and or less 270° C. Examples of the secondary forming processing include bending processing, vacuum forming, blow molding, press forming, and the like.

Although the formed product may be a formed product having a single-layer structure constituted with only a barrier layer formed from the resin composition (hereinafter, may be also referred to as "barrier layer"), the formed product is preferably a multilayer structure including the barrier layer, and other layer, in particular, a thermoplastic resin layer, laminated on at least one face of the barrier layer, in light of an improvement of functions thereof. Due to including the barrier layer and the thermoplastic resin layer, the multilayer structure exhibits superior appearance characteristics, retort resistance and processing characteristics.

The multilayer structure is exemplified by multilayer sheets, multilayer pipes, multilayer fibers, and the like. The other layer constituting the multilayer structure is preferably, for example, a thermoplastic resin layer formed from the thermoplastic resin. Due to including the barrier layer and the thermoplastic resin layer, the multilayer structure exhibits superior appearance characteristics and heat stretching properties.

Examples of the thermoplastic resin include:

high-density, medium-density or low-density polyethylenes;

polyethylenes prepared through copolymerization with vinyl acetate, an acrylic acid ester, or an α-olefin such as butene or hexene;

ionomers;

polypropylene homopolymer;

polypropylenes prepared through copolymerization with an α-olefins such as ethylene, butene or hexene;

polyolefins such as modified polypropylenes obtained by blending a rubber polymer into polypropylenes;

resins obtained by addition or grafting of maleic anhydride to these resins;

polyesters; and the like.

Furthermore, examples of the thermoplastic resin include polyamides, polystyrenes, polyvinyl chlorides, acrylic resins, polyurethanes, polycarbonates, polyvinyl acetates, and the like.

Of these, as the thermoplastic resin, polyethylenes, polypropylenes, polyamides and polyesters are preferred. Specific resin material for forming the thermoplastic resin layer is preferably an unstretched polypropylene film or a nylon 6 film.

Although the layer structure of the multilayer structure is not particularly limited, in light of formability and cost, typical examples thereof include "thermoplastic resin layer/barrier layer/thermoplastic resin layer", "barrier layer/adhesive resin layer/thermoplastic resin layer", "thermoplastic resin layer/adhesive resin layer/barrier layer/adhesive resin layer/thermoplastic resin layer". Of these layer structures, the "thermoplastic resin layer/barrier layer/thermoplastic resin layer", and the "thermoplastic resin layer/adhesive resin layer/barrier layer/adhesive resin layer/thermoplastic resin layer" are preferred. In a case where the thermoplastic resin layer is provided on two outer sides of the barrier layer, the thermoplastic resin layers provided as two outer layers may be formed of resins different from one another, or may be formed of an identical resin.

The method for producing the multilayer structure is not particularly limited, and examples thereof include an extrusion lamination process, a dry lamination process, an extrusion blow molding process, a coextrusion lamination process, a coextrusion molding process, a coextrusion pipe molding process, a coextrusion blow molding process, a coinjection molding process, a solution coating process, and the like.

Of these, the method for producing the multilayer sheet is preferably the coextrusion lamination process or the coextrusion molding process, and more preferably the coextrusion molding process. When the barrier layer and the thermoplastic resin layer are laminated by any of the aforementioned process, the multilayer sheet can be easily and reliably produced, and as a result, superior appearance characteristics, retort resistance and processing characteristics can be effectively achieved.

Examples of the method for forming a formed product using the multilayer sheet include a heat-stretching process, a vacuum forming process, a pressure forming process, a vacuum/pressure forming process, a blow molding process, and the like. These forming/molding processes are typically carried out at a temperature falling within the range of the melting point of the EVOH or below. Of these, the heat-stretching process and the vacuum/pressure forming process are preferred. In the heat-stretching process, the multilayer sheet is heated, and then stretched along one direction or a plurality of directions to achieve forming. In the vacuum/pressure forming process, the multilayer sheet is heated, and formed using a combination of a vacuum and a pressure. By way of an example of the formed product, a packaging material formed from the aforementioned multilayer sheet by the heat-stretching process can be easily and reliably produced, and additionally can exhibit superior appearance characteristics and inhibited unevenness in drawing. Moreover, a container formed from the aforementioned multilayer sheet by vacuum/pressure forming process can be easily and reliably produced, and additionally exhibit more superior appearance characteristics and retort resistance. In addition, these packaging material and container can exhibit inhibited flow marks, and suitable for use in boiling sterilization and retort sterilization.

In the heat-stretching process, the extrusion molded multilayer sheet is preferably quenched immediately after the extrusion molding such that the multilayer sheet has a structure that is as amorphous as possible. Subsequently, the multilayer sheet is again heated at a temperature falling within the range of the melting point of the EVOH (A) or below, and uniaxially or biaxially stretched by a roll stretching method, a pantograph system stretching method, an inflation stretching method or the like. The lower limit of the draw ratio along the machine direction or/and the transverse direction is typically 1.3 times, and preferably 1.5 times in each direction. The upper limit of the draw ratio along the machine direction or/and the transverse direction is typically 9 times, and preferably 4 times in each direction. The lower limit of the heating temperature is typically 50° C., and preferably 60° C. The upper limit of the heating temperature is typically 140° C., and preferably 100° C. When the heating temperature is lower than 50° C., the stretchability may be deteriorated, and changes of dimension may be significant.

In a case where the packaging material is produced using the multilayer sheet through the heat-stretching process, when the resin is used as the thermoplastic resin, more superior appearance characteristics can be exhibited, and additionally defects such as cracks can be further inhibited.

Alternatively, the formed product can also be formed through a coinjection stretch-blow molding process using the aforementioned resin composition and other resin composition. In the coinjection stretch-blow molding process, for example, a preformed product having the multilayer structure through coinjection molding using two or more types of resin compositions, and subsequently the preformed product is subjected to heat stretch-blow molding. Due to being formed using the resin composition exhibiting the aforementioned characteristics through the coinjection stretch-blow molding process, the formed product can be easily and reliably produced, and can exhibit superior appearance characteristics and inhibited flow marks. Examples of the other resin composition include the aforementioned thermoplastic resin, and the like.

It is to be noted that scraps generated in carrying out the thermoforming such as extrusion molding and blow molding, or the like may be blended with the thermoplastic resin layer for recycling, or may be separately used as a recovery layer.

In the aforementioned vacuum/pressure forming process, the multilayer sheet is, for example, heated to be softened, and thereafter formed so as to fit a die shape. Examples of the forming method include a process in which forming is carried out so as to fit a die shape by means of vacuum or compressed air, which may be used in combination with a plug in addition, if necessary (a straight process, a drape process, an air slip process, a snap-back process, a plug-assist process, and the like), a method involving press forming, and the like. Various types of forming conditions such as the forming temperature, the degree of vacuum, the pressure of the compressed air, and the forming speed may be appropriately decided in accordance with the shape of the plug and/or the die, as well as properties of a film and/or a sheet as a base material, and the like.

The forming temperature is not particularly limited as long as the resin is softened sufficiently to be formed at the temperature. For example, in a case where the multilayer sheet is subjected to thermoforming, it is desired that the temperature of heating is not: too high where melting of the film by heating occurs or the roughness of a metal surface of a heater plate is transferred to the film; or too low where shaping cannot be sufficiently attained. Specifically, the lower limit of the temperature of the multilayer sheet is typically 50° C., and preferably 60° C. The upper limit of the temperature is typically 180° C., and preferably 160° C.

The container is produced by thermoforming the multilayer sheet into a three-dimensional shape such that a recessed part is provided on the plane of the multilayer sheet. The container is suitably formed through the aforementioned vacuum/pressure forming process. The shape of the recessed part may be decided in accordance with the shape of the contents. In particular, as the depth of the recessed part is greater, or as the shape of the recessed part is less smooth, the improvement effect exerted by the present invention is significant since for such a shape of the recessed part, typical EVOH laminates are more likely to cause unevenness in thickness, leading to extreme slimming at corner portions and the like. In a case where the container is formed from a multilayer film having an entire layer thickness of less than about 300 μm, the effects of the invention may be exhibited more effectively at a draw ratio (S) of suitably 0.2 or greater, more suitably 0.3 or greater, and still more suitably 0.4 or greater. Alternatively, in a case where the container is formed from a multilayer sheet having an entire layer thickness of about 300 μm or greater, the effects of the invention may be exhibited more effectively at a draw ratio (S) of suitably 0.3 or greater, more suitably 0.5 or greater, and still more suitably 0.8 or greater.

The draw ratio (S) as referred to herein means a value calculated using the following formula (1).

$$S=(a \text{ depth of the container})/(\text{the diameter of the largest circle inscribed in the opening of the container}) \quad (1)$$

In other words, the draw ratio (S) is a value obtained by dividing a value of the depth of the bottom of the recessed part of the container by a value of the diameter of the largest inscribed circle tangent to the shape of the recessed part (opening) provided on the plane of the multilayer sheet. The value of the diameter of the largest inscribed circle corresponds to, for example: a diameter of a circular shape when the shape of the opening of the recessed part is circular; a minor axis of an elliptical shape when the shape of the opening of the recessed part is elliptical; and a length of the shorter side of a rectangular shape when the shape of the opening of the recessed part is rectangular.

EXAMPLES

Hereinafter, the present invention is specifically explained by way of Examples, but the present invention is not in anyhow limited to these Examples. It is to be noted that each quantitative determination in these Examples was carried out using the following method.
Determination of Moisture Content of Hydrous EVOH Pellets The moisture content of hydrous EVOH pellets was determined under conditions involving a drying temperature of 180° C., a drying time period of 20 min and a sample amount of about 10 g using a halogen moisture analyzer "HR73" available from Mettler-Toledo International Inc. The moisture content of the hydrous EVOH set forth in the following is expressed in % by mass with respect to the mass of the dry EVOH.

Ethylene Content and Degree of Saponification of EVOH (A)

The determination was made based on $^1$H-NMR recorded on a nuclear magnetic resonance apparatus (model "JNM-GX-500" available from JEOL, Ltd.) using DMSO-$d_6$ as a solvent for measurement.
Quantitative Determination of Carboxylic Acid and Carboxylic Aid Ion Dry EVOH pellets were ground by freeze grinding. Thus resulting ground EVOH was sieved with a sieve having a nominal dimension of 1 mm (according to normal sieve standard JIS Z8801-1 to 3). Ten grams of the EVOH powder having passed the sieve and 50 mL of ion exchanged water were charged into a stoppered 100 mL Erlenmeyer flask, and stirred 95° C. for 10 hours after the stoppered Erlenmeyer flask was equipped with a cooling condenser. Two mL of the resulting solution was diluted with 8 mL of ion exchanged water. The amount of a carboxylic acid ion in this diluted solution was quantitatively determined using an ion chromatography "ICS-1500" available from Yokogawa Electric Corporation according to the following measurement conditions, whereby the amount of the carboxylic acid and the carboxylic acid ion was calculated. It is to be noted that in the quantitative determination, a calibration curve created using a monocarboxylic acid or a polyhydric carboxylic acid was used.

Measurement Conditions:
column: "IonPAC ICE-AS1 (9φ×250 mm, electric conductivity detector)" available from DIONEX;
eluent: 1.0 mmol/L aqueous octanesulfonic acid solution;
measurement temperature: 35° C.;
eluent flow rate: 1 mL/min; and
amount used for the analysis: 50 μL.
Quantitative Determination of Metal Ion Into a polytetrafluoroethylene pressure container available from Actac Project Services Corporation were charged 0.5 g of dry EVOH pellets, and 5 mL of nitric acid for accurate analysis available from Wako Pure Chemical Industries, Ltd. was further added thereto. After the pressure container was left to stand for 30 min, the container was closed with a cap lip having a rupture disk, and the dry EVOH pellets were treated at 150° C. for 10 min, and then 180° C. for 10 min using a microwave high speed decomposition system "speedwave MWS-2" available from Actac Project Services Corporation, whereby the dry EVOH pellets were decomposed. In a case where the decomposition of the dry EVOH pellets was incomplete, the treatment conditions were appropriately adjusted. The resulting decomposition product was diluted with 10 mL of ion exchanged water, all the liquid was transferred to a 50 mL volumetric flask, and the volume of the liquid was adjusted to 50 mL with ion exchanged water, whereby a decomposition product solution was prepared. The decomposition product solution thus obtained was subjected to a quantitative determination analysis at the measurement wavelength set forth below using an ICP optical emission spectrophotometer "Optima 4300 DV" available from PerkinElmer Japan Co., Ltd., whereby the amounts of the metal ion, the phosphorus compound and the boron compound were quantitatively determined. The amount of the phosphorus compound was calculated as a mass in terms of phosphorus element equivalent after the quantitative determination of the phosphorus element. The content of the boron compound was calculated as a mass in terms of boric acid equivalent.

Na: 589.592 nm;
K: 766.490 nm;
Mg: 285.213 nm;

Ca: 317.933 nm;
P: 214.914 nm;
B: 249.667 nm;
Si: 251.611 nm;
Al: 396.153 nm;
Zr: 343.823 nm;
Ce: 413.764 nm;
W: 207.912 nm; and
Mo: 202.031 nm.

Quantitative Determination of Saturated Carbonyl Compound (D)

A 2,4-dinitrophenylhydrazine (DNPH) solution was prepared by adding 50 mL of 1,1,1,3,3,3-hexafluoroisopropanol (HFIP), 11.5 mL of acetic acid and 8 mL of ion exchanged water to 200 mg of a 50% by mass aqueous solution of DNPH. Sample pellets in an amount of 1 g were added to 20 mL of the DNPH solution, and dissolved at 35° C. for 1 hour with stirring. Acetonitrile was added to this solution to permit precipitation and sedimentation of the resin content, followed by filtration, and the resulting solution was concentrated, whereby an extraction sample was obtained. This extraction sample was analyzed for quantitative determination by high performance liquid chromatography under the following conditions, whereby the saturated carbonyl compound (D) was quantitatively determined. It is to be noted that in the quantitative determination, a calibration curve created from a reaction of an authentic sample of each saturated carbonyl compound (D) with the DNPH solution was used. In addition, the detection lower limit of the saturated carbonyl compound (D) was 0.01 ppm.

column: TSKgel ODS-80 Ts (available from Tosoh Corporation)

mobile phase: water/acetonitrile=52:48 (volume ratio)

detector: photodiode array detector (360 nm), TOF-MS

Quantitative Determination of Conjugated Polyene Compound

Dry resin composition pellets were ground by freeze grinding, and 10 g of a ground matter obtained by eliminating coarse particles using a sieve having a nominal dimension of 0.150 mm (100 mesh, according to JIS Z8801-1 to 3) was packed into a Soxhlet extraction apparatus to execute an extraction treatment using 100 mL of chloroform for 48 hours. This extraction liquid was analyzed for quantitative determination by high performance liquid chromatography to quantitatively determine the amount of the conjugated polyene compound. It is to be noted that in the quantitative determination, a calibration curve created using an authentic sample of each conjugated polyene compound was used.

Synthesis of EVOH (A)

Synthesis Example 1

Using a 250 L pressure reactor, the polymerization was carried out under the following conditions to synthesize an ethylene-vinyl acetate copolymer.

Amount Charged
    vinyl acetate: 83.0 kg
    methanol: 17.4 kg
    2,2'-azobisisobutyronitrile: 66.4 g Polymerization Conditions:
    polymerization temperature: 60° C.
    pressure of ethylene in polymerization tank: 3.9 MPa
    polymerization time period: 3.5 hours The conversion of vinyl acetate in the polymerization was 36%. After sorbic acid was added to the resulting copolymerization reaction mixture, the reaction mixture was supplied to a purge tower, and unreacted vinyl acetate was eliminated from the top of the tower by introducing methanol vapor from the bottom of the tower, whereby a 41% by mass methanol solution of the ethylene-vinyl acetate copolymer was obtained. This ethylene-vinyl acetate copolymer had an ethylene content of 32 mol %. This methanol solution of the ethylene-vinyl acetate copolymer was charged into a saponification reactor, and a solution of sodium hydroxide in methanol (80 g/L) was added so as to attain 0.4 equivalents with respect to the vinyl ester unit in the copolymer. Thereto was further added methanol to adjust the copolymer concentration to 20% by mass. The temperature of this solution was elevated to 60° C., and the reaction was allowed while blowing nitrogen gas into the reactor for about 4 hours. This solution was then extruded into water from a die plate provided with a circular opening to permit deposition, followed by cutting to give pellets having a diameter about of 3 mm and a length about of 5 mm. The pellets were subjected to deliquoring using a centrifugal separator, and an operation of further adding a large amount of water thereto and deliquoring the pellets was repeated, whereby pellets of the EVOH (A) was obtained. The degree of saponification of the EVOH (A) thus obtained was 99.95 mol %.

Synthesis Example 2

Pellets were obtained by polymerizing, saponifying, pelletizing and washing in a similar manner to Synthesis Example 1 except that propanal was supplied so as to be contained in an amount of 0.5 ppm with respect of the EVOH (A) during the polymerization. The EVOH (A) thus obtained had an ethylene content of 32 mol % and a degree of saponification of 99.95 mol %.

Synthesis Example 3

Pellets were obtained by polymerizing, saponifying, pelletizing and washing in a similar manner to Synthesis Example 1 except that acetone was supplied so as to be contained in an amount of 0.5 ppm with respect to the EVOH (A) during the polymerization. The EVOH (A) thus obtained had an ethylene content of 32 mol % and a degree of saponification of 99.95 mol %.

Preparation of Resin Composition

Examples 1 to 12 and 15, and Comparative Examples 2 to 6

Twenty kg of the pellets obtained in Synthesis Example 1 described above were added to 180 kg of a mixed solvent of water and methanol (mass ratio: water/methanol=40/60), and the mixture was stirred at 60° C. for 6 hours to completely dissolve the pellets. To the solution thus obtained were added predetermined amounts of propanal and sorbic acid, and this mixture was further stirred for 1 hour such that propanal was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin chips. The obtained chips were washed with an aqueous acetic acid solution and ion exchanged water. The chips were separated from the washing liquid, followed by deliquoring, and thereafter dried in hot-air dryer at 80° C. for 4 hours and further 100° C. for 16 hours to obtain propanal-containing EVOH pellets. The content of propanal in the pellets obtained was quantitatively determined according to the method for quantitative determination. The propanal-containing EVOH pellets were prepared such that the content of propanal was as shown in Table 1 by regulating the amount of propanal added.

The propanal-containing EVOH pellets prepared as described above and a polyamide ("Ny1018A (nylon 6)" available from Ube Industries, Ltd.), as well as magnesium acetate tetrahydrate, zinc acetate dihydrate or calcium acetate dihydrate were mixed such that each content shown in Table 1 was attained. After dry-blending, the blend was subjected to extrusion and pelletization using a twin-screw extruder ("2D25W" available from Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Examples 13 and 14

Resin compositions were prepared in a similar manner to Examples 1 to 12 using the pellets obtained in Synthesis Example 1 described above and, as the saturated aldehyde (D-1), butanal and hexanal in Example 13 and Example 14, respectively, in place of propanal, whereby saturated aldehyde-containing EVOH pellets were obtained. It is to be noted that the content of the saturated aldehyde (D-1) in the pellets thus obtained was quantitatively determined according to the method for quantitative determination, whereby the saturated aldehyde-containing EVOH pellets were prepared such that the content of the saturated aldehyde (D-1) in the pellets thus obtained was as shown in Table 1. Furthermore, a polyamide ("Ny1018A (nylon 6)" available from Ube Industries, Ltd.) and magnesium acetate tetrahydrate were mixed such that each content shown in Table 1 was attained. After dry-blending, the blend was subjected to extrusion and pelletization using a twin-screw extruder ("2D25W" available from Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Comparative Example 1

Twenty kg of the pellets obtained in Synthesis Example 2 described above were washed with an aqueous acetic acid solution and ion exchanged water. The chips were separated from the washing liquid, followed by deliquoring, and thereafter were dried in a hot-air dryer at 80° C. for 4 hours and further 100° C. for 16 hours, whereby EVOH pellets were obtained.

The EVOH pellets prepared as described above, a polyamide ("Ny1018A (nylon 6)" available from Ube Industries, Ltd.), and magnesium acetate tetrahydrate were mixed such that each content shown in Table 1 was attained. After dry-blending, the blend was subjected to extrusion and pelletization using a twin-screw extruder ("2D25W" available from Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Examples 16 to 27 and 30, and Comparative Examples 8 to 12

Twenty kg of the pellets obtained in Synthesis Example 1 described above were added to 180 kg of a mixed solvent of water and methanol (mass ratio: water/methanol=40/60), and the mixture was stirred at 60° C. for 6 hours to completely dissolve the pellets. To the solution thus obtained were added predetermined amounts of acetone and sorbic acid, and this mixture was further stirred for 1 hour such that acetone was completely dissolved, whereby a resin solution was obtained. This resin solution was continuously extruded from a nozzle having a diameter of 4 mm into a coagulation bath containing a mixture of water and methanol (mass ratio: water/methanol=90/10) adjusted at 0° C. so as to give a strand form. This strand was introduced into a pelletizing machine to obtain porous resin chips. The obtained chips were washed with an aqueous acetic acid solution and ion exchanged water. The chips were separated from the washing liquid, followed by deliquoring, and thereafter dried in hot-air dryer at 80° C. for 4 hours and further 100° C. for 16 hours, whereby acetone-containing EVOH pellets were obtained. The content of acetone in the pellets obtained was quantitatively determined according to the method for quantitative determination. The acetone-containing EVOH pellets were prepared such that the content of acetone was as shown in Table 2 by regulating the amount of acetone added.

The acetone-containing EVOH pellets prepared as described above and a polyamide ("Ny1018A (nylon 6)" available from Ube Industries, Ltd.), as well as magnesium acetate tetrahydrate, zinc acetate dihydrate or calcium acetate dihydrate were mixed such that each content shown in Table 2 was attained. After dry-blending, the blend was subjected to extrusion and pelletization using a twin-screw extruder ("2D25W" available from Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Examples 28 and 29

Resin compositions were prepared in a similar manner to Examples 16 to 27 using the pellets obtained in Synthesis Example 1 described above and, as the saturated ketone (D-2), methyl ethyl ketone and 2-hexanone in Example 28 and Example 29, respectively, in place of acetone, whereby saturated ketone-containing EVOH pellets were obtained. It is to be noted that the content of the saturated ketone (D-2) in the pellets obtained thus was quantitatively determined according to the method for quantitative determination, whereby the saturated ketone-containing EVOH pellets were prepared such that the content of the saturated ketone (D-2) in the pellets obtained thus was as shown in Table 2. Furthermore, a polyamide ("Ny1018A (nylon 6)" available from Ube Industries, Ltd.) and magnesium acetate tetrahydrate were mixed such that each content shown in Table 2 was attained. After dry-blending, the blend was subjected to extrusion and pelletization using a twin-screw extruder ("2D25W" available from Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Comparative Example 7

Twenty kg of the pellets obtained in Synthesis Example 3 were washed with an aqueous acetic acid solution and ion exchanged water. The chips were separated from the washing liquid, followed by deliquoring, and thereafter were dried in a hot-air dryer at 80° C. for 4 hours and further 100° C. for 16 hours, whereby EVOH pellets were obtained.

The EVOH pellets prepared as described above, a polyamide ("Ny1018A (nylon 6)" available from Ube Industries, Ltd.), and magnesium acetate tetrahydrate were mixed such that each content shown in Table 2 was attained. After dry-blending, the blend was subjected to extrusion and pelletization using a twin-screw extruder ("2D25W" available from Toyo Seiki Seisaku-sho, Ltd.; 25 mmφ) in a nitrogen atmosphere under extrusion conditions involving a die temperature of 250° C. and a screw rotation speed of 100 rpm, whereby intended resin composition pellets were obtained.

Production of Multilayer Sheet

Using a single screw extrusion apparatus ("D2020" available from Toyo Seiki Seisaku-sho, Ltd., (D (mm)=20, L/D=20, compression ratio=2.0, screw: full flight)), a single-layer film having a thickness of 20 μm was produced from the pellets of each resin composition thus obtained. In this procedure, each extrusion condition was as in the following.

extrusion temperature: 250° C.
screw rotation speed: 40 rpm
die width: 30 cm
roll drawing temperature: 80° C.
roll drawing speed: 3.1 m/min The single-layer film produced as described above, a commercially available biaxially stretched nylon 6 film ("Emblem ON" available from Unitika Limited; thickness: 15 μm) and a commercially available unstretched polypropylene film ("Tohcello CP" available from Mitsui Chemicals Tohcello Inc.; thickness: 60 μm) were each cut into an A4 size piece. An adhesive for dry lamination was applied to both faces of the single-layer film, and then dry lamination was carried out such that the nylon 6 film was provided as an outer layer and the unstretched polypropylene film was provided as an inner layer. The laminated film thus obtained was dried at 80° C. for 3 min, whereby a dilution liquid was evaporated to obtain a transparent multilayer sheet having 3 layers. The adhesive for dry lamination used contained "TAKELAC A-385" available from Takeda Chemical Industries, Ltd. as a base material, "TAKENATE A-50" available from Takeda Chemical Industries, Ltd. as a curing agent and ethyl acetate as a dilution liquid. The amount of the adhesive applied was 4.0 g/m. After the lamination, aging was carried out at 40° C. for 3 days.

Evaluations

The resin compositions and the multilayer sheets obtained as described above were evaluated as in the following. The results of the evaluations are shown together in Tables 1 and 2.

Odor in Molding

Into a 100 mL glass sample tube were charged 20 g of sample pellets of the resin composition, and the opening of the sample tube was covered with an aluminum foil lid. Then, the sample tube was heated in a hot-air dryer at 220° C. for 30 min. The sample tube was taken out from the dryer and allowed to cool at room temperature for 30 min. Thereafter, the sample tube was shaken two or three times, and then an evaluation of the odor was made after removing the aluminum foil lid. The intensity of the odor of the sample pellets was evaluated according to the following criteria.

A: the odor not being recognized;
B: the odor being slightly recognized; and
C: the odor being clearly recognized.

Inhibitory Effects on Generation of Burnt Deposits

Using a single screw extrusion apparatus ("D2020" available from Toyo Seiki Seisaku-sho, Ltd.; D (mm)=20, L/D=20, compression ratio=2.0, screw: full flight), a single-layer film having a thickness of 20 μm was produced from the dry pellets of each resin composition. In this procedure, each condition was as in the following.

extrusion temperature: 250° C.
screw rotation speed: 40 rpm
die width: 30 cm
roll drawing temperature: 80° C.
roll drawing speed: 3.1 m/min A continuous operation was carried out under the conditions described above to produce a single-layer film, then the resin was changed to low density polyethylene ("Novatec LF128" available from Japan Polyethylene Corporation) after 8 hours from the start of the operation, and film formation was carried out for 30 min under identical conditions. Thereafter, the die was disassembled and the low density polyethylene was removed, and the amount of burnt deposits attached to the surface of the die channel was determined. The inhibitory effect on the generation of burnt deposits was evaluated in accordance with the following evaluation criteria.

"A (favorable)": less than 0.01 g;
"B (somewhat favorable)": 0.01 g or more and less than 1.0 g; and
"C (unfavorable)": 1.0 g or more.

Coloring-Inhibitory Effect

Using a single screw extrusion apparatus ("D2020" available from Toyo Seiki Seisaku-sho, Ltd.; D (mm)=20, L/D=20, compression ratio=2.0, screw: full flight), a single-layer film having a thickness of 20 μm was produced from the dry pellets of each resin composition. In this procedure, each condition is as in the following.

extrusion temperature: 250° C.
screw rotation speed: 40 rpm
die width: 30 cm
roll drawing temperature: 80° C.
roll drawing speed: 3.1 m/min A continuous operation was carried out under the conditions described above to produce a single-layer film, and the appearance characteristic (coloring) of each film produced after 15 hours from the start of the operation was evaluated by a visual inspection in accordance with the following evaluation criteria.

Evaluation Criteria of Coloring
"favorable (A)": colorless;
"somewhat favorable (B)": yellowed; and
"unfavorable (C)": significantly yellowed.

Retort Resistance of Formed Product

A pouch sealed along four sides and having an inside dimension of 12×12 cm was produced using the multilayer sheet obtained as described above. Water was charged therein as the contents. This pouch was subjected to a retort treatment at 120° C. for 20 min using a retorting apparatus (high-temperature and high-pressure cooking sterilization tester ("RCS-40RTGN" available from Hisaka Works, Ltd.). After the retort treatment, water on the surface was wiped off, and the pouch was left to stand in a high humidity chamber at 20° C. and 65% RH for 1 day, and then the retort resistance was evaluated. The retort resistance was evaluated to be: "A (favorable)" in a case where the transparency was maintained; and "B (unfavorable)" in a case where uneven blooming was found.

TABLE 1

| | EVOH (A) (% by mass) | PA (B) (% by mass) | Carboxylic acid metal salt (C) metal type | Carboxylic acid metal salt (C) content (ppm) | Saturated aldehyde (D-1) substance | Saturated aldehyde (D-1) content (ppm) | Odor in molding | Inhibitory effect on generation of burnt deposits | Coloring-inhibitory effects | Retort resistance |
|---|---|---|---|---|---|---|---|---|---|---|
| Example 1 | 80 | 20 | Mg | 75 | propanal | 0.09 | B | B | A | A |
| Example 2 | 80 | 20 | Mg | 75 | propanal | 10 | A | A | A | A |
| Example 3 | 80 | 20 | Mg | 75 | propanal | 42 | A | A | A | A |
| Example 4 | 80 | 20 | Mg | 75 | propanal | 0.3 | A | A | A | A |
| Example 5 | 90 | 10 | Mg | 75 | propanal | 0.3 | A | A | A | A |
| Example 6 | 65 | 35 | Mg | 75 | propanal | 0.3 | A | A | A | A |
| Example 7 | 80 | 20 | Mg | 3 | propanal | 0.3 | B | B | A | A |
| Example 8 | 80 | 20 | Mg | 300 | propanal | 0.3 | A | A | A | A |
| Example 9 | 80 | 20 | Mg | 10 | propanal | 0.3 | A | A | A | A |
| Example 10 | 80 | 20 | Mg | 150 | propanal | 0.3 | A | A | A | A |
| Example 11 | 80 | 20 | Zn | 75 | propanal | 0.3 | A | A | A | A |
| Example 12 | 80 | 20 | Ca | 75 | propanal | 0.3 | A | A | A | A |
| Example 13 | 80 | 20 | Mg | 75 | butanal | 0.3 | B | B | B | A |
| Example 14 | 80 | 20 | Mg | 75 | hexanal | 0.3 | B | B | B | A |
| Example 15 | 80 | 20 | Mg | 75 | propanal | 0.02 | B | B | B | A |
| Comparative Example 1 | 80 | 20 | Mg | 75 | propanal | N.D.*[1] | C | C | C | A |
| Comparative Example 2 | 80 | 20 | Mg | 600 | propanal | 0.02 | C | C | C | A |
| Comparative Example 3 | 80 | 20 | Mg | 0.5 | propanal | 0.3 | C | C | B | A |
| Comparative Example 4 | 80 | 20 | Mg | 1,000 | propanal | 0.3 | C | C | C | B |
| Comparative Example 5 | 98 | 2 | Mg | 75 | propanal | 0.3 | A | A | B | B |
| Comparative Example 6 | 50 | 50 | Mg | 75 | propanal | 0.3 | C | C | B | A |

*[1] less than detection limit (0.01 ppm)

TABLE 2

| | EVOH (A) (% by mass) | PA (B) (% by mass) | Carboxylic acid metal salt (C) metal type | Carboxylic acid metal salt (C) content (ppm) | Saturated ketone (D-2) substance | Saturated ketone (D-2) content (ppm) | Odor in molding | Inhibitory effects on generation of burnt deposits | Coloring-inhibitory effects | Retort resistance |
|---|---|---|---|---|---|---|---|---|---|---|
| Example 16 | 80 | 20 | Mg | 75 | acetone | 0.09 | B | B | A | A |
| Example 17 | 80 | 20 | Mg | 75 | acetone | 10 | A | A | A | A |
| Example 18 | 80 | 20 | Mg | 75 | acetone | 42 | A | A | A | A |
| Example 19 | 80 | 20 | Mg | 75 | acetone | 0.3 | A | A | A | A |
| Example 20 | 90 | 10 | Mg | 75 | acetone | 0.3 | A | A | A | A |
| Example 21 | 65 | 35 | Mg | 75 | acetone | 0.3 | A | A | A | A |
| Example 22 | 80 | 20 | Mg | 3 | acetone | 0.3 | A | B | A | A |
| Example 23 | 80 | 20 | Mg | 300 | acetone | 0.3 | A | A | A | A |
| Example 24 | 80 | 20 | Mg | 10 | acetone | 0.3 | A | A | A | A |
| Example 25 | 80 | 20 | Mg | 150 | acetone | 0.3 | A | A | A | A |
| Example 26 | 80 | 20 | Zn | 75 | acetone | 0.3 | A | A | A | A |
| Example 27 | 80 | 20 | Ca | 75 | acetone | 0.3 | A | A | A | A |
| Example 28 | 80 | 20 | Mg | 75 | methyl ethyl ketone | 42 | B | B | B | A |
| Example 29 | 80 | 20 | Mg | 75 | 2-hexanone | 42 | B | B | B | A |
| Example 30 | 80 | 20 | Mg | 75 | acetone | 0.02 | B | B | B | A |
| Comparative Example 7 | 80 | 20 | Mg | 75 | acetone | N.D.*[1] | C | C | C | A |
| Comparative Example 8 | 80 | 20 | Mg | 600 | acetone | 0.02 | C | C | C | A |
| Comparative Example 9 | 80 | 20 | Mg | 0.5 | acetone | 0.3 | C | C | B | A |
| Comparative Example 10 | 80 | 20 | Mg | 1,000 | acetone | 0.3 | C | C | C | B |
| Comparative Example 11 | 98 | 2 | Mg | 75 | acetone | 0.3 | C | C | B | B |
| Comparative Example 12 | 50 | 50 | Mg | 75 | acetone | 0.3 | C | C | B | A |

*[1] less than detection limit (0.01 ppm)

As is clear from the results shown in Tables 1 and 2, the resin compositions and the multilayer sheets of Examples exhibited superior inhibitory effects on the generation of burnt deposits and superior inhibitory effects on the generation of the odor within the molding machine in the operation over a long time period, as well as superior retort resistance. On the other hand, the resin compositions and the multilayer sheets of Comparative Examples in which the content of the saturated carbonyl compound (D), the content of the carboxylic acid metal salt (C), or the mass ratio of EVOH/PA did not fall within a predetermined range were inferior in the generation of the odor in molding or the inhibitory effects on the generation of burnt deposits within the molding machine, or the retort resistance.

Production of Container

Example 31

The resin composition obtained in Example 4, polyolefin (a), polyolefin (a') and carboxylic acid-modified polyolefin (b) were charged into separate extruders under the following conditions for extrusion molding, and a multilayer sheet having an entire layer thickness of 1,000 μm and having seven layers of four types constituting a structure of (a)/(a')/(b)/resin composition/(b)/(a')/(a) (each layer thickness: 200 μm/225 μm/25 μm/100 μm/25 μm/225 μm/200 μm) was obtained using a coextrusion sheet molding apparatus.
Each Extruder and Extrusion Condition
    extruder for polyolefin (a): single screw, screw diameter of 65 mm, L/D=22, temperature of 200° C. to 240° C. (Polypropylene)
    extruder for resin composition obtained in Example 4: single screw, screw diameter of 40 mm, L/D=26, temperature of 170° C. to 210° C.
    extruder for carboxylic acid-modified polyolefin (b): single screw, screw diameter of 40 mm, L/D=26, temperature of 160° C. to 220° C. (maleic anhydride-modified polypropylene adhesive resin ("ADMER QF-500" available from Mitsui Chemicals, Inc.))
    extruder for polyolefin (a'): single screw, screw diameter of 40 mm, L/D=22, temperature of 160° C. to 210° C. (Polypropylene)
Molding Conditions of Coextrusion Sheet Molding Apparatus
    feed block die (width: 600 mm), temperature of 240° C.

The obtained multilayer sheet was heated for 1.5 sec in a thermoforming machine ("R530" available from MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compressed air (pressure of 5 kgf/cm² (0.5 MPa)) was blown thereinto to execute forming, whereby a container was obtained. The obtained container was a favorable formed product exhibiting superior appearance characteristics with no burnt deposits.

Example 32

The multilayer sheet obtained in Example 31 was subjected to thermoforming (compressed air: 5 kgf/cm² (0.5 MPa); plug: 45φ×65 mm; syntax form; plug temperature: 150° C.; die temperature: 70° C.) into a cup shape (die shape: 70φ×70 mm; draw ratio S=1.0) using a thermoforming machine (available from Asano Laboratories Co. Ltd.) at a temperature of the multilayer sheet of 150° C. The cup container thus obtained was a favorable formed product exhibiting superior appearance characteristics without unevenness in melting.

Production of Packaging Material

Example 33

The multilayer sheet obtained in Example 31 was mounted on a pantograph type biaxial stretching machine, and simultaneous biaxial stretching was carried out at 70° C. with a draw ratio of 3×3 times. Unevenness in drawing was not found on the stretched multilayer sheet.

Comparative Example 13

The resin composition obtained in Comparative Example 1, polyolefin (a), polyolefin (a') and carboxylic acid-modified polyolefin (b) were charged into separate extruders under the following conditions for extrusion molding, and a multilayer sheet having an entire layer thickness of 1,000 μm and having seven layers of four types constituting a structure of (a)/(a')/(b)/resin composition/(b)/(a')/(a) (each layer thickness: 200 μm/225 μm/25 μm/100 μm/25 μm/225 μm/200 μm) was obtained using a coextrusion sheet molding apparatus.
Each Extruder and Extrusion Condition
    extruder for polyolefin (a): single screw, screw diameter of 65 mm, L/D=22, temperature of 200 to 240° C. (Polypropylene)
    extruder for resin composition obtained in Comparative Example 1: single screw, screw diameter of 40 mm, L/D=26, temperature of 170 to 210° C.
    extruder for carboxylic acid-modified polyolefin (b): single screw, screw diameter of 40 mm, L/D=26, temperature of 160 to 220° C. (maleic anhydride-modified polypropylene adhesive resin ("ADMER QF-500" available from Mitsui Chemicals, Inc.))
    extruder for polyolefin (a'): single screw, screw diameter of 40 mm, L/D=22, temperature of 160 to 210° C. (Polypropylene)
Molding Condition of Coextrusion Sheet Molding Machine
    feed block die (width: 600 mm), temperature of 240° C.

The obtained multilayer sheet was heated for 1.5 sec in a thermoforming machine ("R530" available from MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compressed air (pressure of 5 kgf/cm² (0.5 MPa)) was blown thereinto to execute forming, whereby a container was obtained. Burnt deposits were found on the container thus obtained.

Comparative Example 14

The multilayer sheet obtained in Comparative Example 13 was subjected to thermoforming (compressed air: 5 kg/cm² (0.5 MPa); plug: 45φ×65 mm; syntax form; plug temperature: 150° C.; die temperature: 70° C.) into a cup shape (die shape: 70φ×70 mm; draw ratio S=1.0) using a thermoforming machine (available from Asano Laboratories Co. Ltd.) at a temperature of the multilayer sheet of 150° C. Unevenness in melting was found on the cup container thus obtained.

Comparative Example 15

The multilayer sheet obtained in Comparative Example 13 was mounted on a pantograph type biaxial stretching machine, and simultaneous biaxial stretching was carried out at 70° C. at a draw ratio of 3×3 times. Unevenness in drawing was found on the stretched multilayer sheet.

Production of Container

Example 34

The resin composition obtained in Example 19, polyolefin (a), polyolefin (a') and carboxylic acid-modified polyolefin (b) were charged into separate extruders under the following conditions for extrusion molding, and a multilayer sheet having an entire layer thickness of 1,000 μm and having seven layers of four types constituting a structure of (a)/(a')/(b)/resin composition/(b)/(a')/(a) (each layer thickness: 200 μm/225 μm/25 μm/100 μm/25 μm/225 μm/200 μm) was obtained using a coextrusion sheet molding apparatus.
Each Extruder and Extrusion Condition
  extruder for polyolefin (a): single screw, screw diameter of 65 mm, L/D=22, temperature of 200° C. to 240° C. (Polypropylene)
  extruder for resin composition obtained in Example 19: single screw, screw diameter of 40 mm, L/D=26, temperature of 170° C. to 210° C.
  extruder for carboxylic acid-modified polyolefin (b): single screw, screw diameter of 40 mm, L/D=26, temperature of 160° C. to 220° C. (maleic anhydride-modified polypropylene adhesive resin ("ADMER QF-500" available from Mitsui Chemicals, Inc.)
  extruder for polyolefin (a'): single screw, screw diameter of 40 mm, L/D=22, temperature of 160° C. to 210° C. (Polypropylene)
Molding Conditions of Coextrusion Sheet Molding Apparatus
  feed block die (width: 600 mm), temperature of 240° C.

The obtained multilayer sheet was heated for 1.5 sec in a thermoforming machine ("R530" available from MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compressed air (pressure of 5 kgf/cm$^2$ (0.5 MPa)) was blown thereinto to execute forming, whereby a container was obtained. The obtained container was a favorable formed product exhibiting superior appearance characteristics with no burnt deposits.

Example 35

The multilayer sheet obtained in Example 34 was subjected to thermoforming (compressed air: 5 kgf/cm$^2$ (0.5 MPa); plug: 45φ×65 mm; syntax form; plug temperature: 150° C.; die temperature: 70° C.) into a cup shape (die shape: 70φ×70 mm; draw ratio S=1.0) using a thermoforming machine (available from Asano Laboratories Co. Ltd.) at a temperature of the multilayer sheet of 150° C. The obtained cup container was a favorable formed product exhibiting superior appearance characteristics without unevenness in melting.

Production of Packaging Material

Example 36

The multilayer sheet obtained in Example 34 was mounted on a pantograph type biaxial stretching machine, and simultaneous biaxial stretching was carried out at 70° C. at a draw ratio of 3×3 times. Unevenness in drawing was not found on the stretched multilayer sheet.

Comparative Example 16

The resin composition obtained in Comparative Example 7, polyolefin (a), polyolefin (a') and carboxylic acid-modified polyolefin (b) were charged into separate extruders under the following conditions for extrusion molding, and a multilayer sheet having an entire layer thickness of 1,000 μm and having seven layers of four types constituting a structure of (a)/(a')/(b)/resin composition/(b)/(a')/(a) (each layer thickness: 200 μm/225 μm/25 μm/100 μm/25 μm/225 μm/200 μm) was obtained using a coextrusion sheet molding apparatus.
Each Extruder and Extrusion Condition
  extruder for polyolefin (a): single screw, screw diameter of 65 mm, L/D=22, temperature of 200 to 240° C. (Polypropylene)
  extruder for the resin composition obtained in Comparative Example 7: single screw, screw diameter of 40 mm, L/D=26, temperature of 170 to 210° C.
  extruder for carboxylic acid-modified polyolefin (b): single screw, screw diameter of 40 mm, L/D=26, temperature of 160 to 220° C. (maleic anhydride-modified polypropylene adhesive resin ("ADMER QF-500" available from Mitsui Chemicals, Inc.)
  extruder for polyolefin (a'): single screw, screw diameter of 40 mm, L/D=22, temperature of 160 to 210° C. (Polypropylene)
Molding Condition of Coextrusion Sheet Molding Machine
  feed block die (width: 600 mm), temperature of 240° C.

The obtained multilayer sheet was heated for 1.5 sec in a thermoforming machine ("R530" available from MULTIVAC) in which the temperature of a heater plate was adjusted to 100° C., whereby the temperature of the sheet was elevated to about 85° C. Thereafter, the sheet was placed in a die (giving a cuboid shape having a length of 130 mm, a width of 110 mm and a depth of 50 mm; draw ratio S=0.45), and then compressed air (pressure of 5 kgf/cm$^2$ (0.5 MPa)) was blown thereinto to execute forming, whereby a container was obtained. Burnt deposits were found on the container thus obtained.

Comparative Example 17

The multilayer sheet obtained in Comparative Example 16 was subjected to thermoforming (compressed air: 5 kg/cm$^2$ (0.5 MPa); plug: 45φ×65 mm; syntax form; plug temperature: 150° C.; die temperature: 70° C.) into a cup shape (die shape: 70φ×70 mm; draw ratio S=1.0) using a thermoforming machine (available from Asano Laboratories Co. Ltd.) at a temperature of the multilayer sheet of 150° C. Unevenness in melting was found on the cup container thus obtained.

Comparative Example 18

The multilayer sheet obtained in Comparative Example 16 was mounted on a pantograph type biaxial stretching machine, and simultaneous biaxial stretching was carried out at 70° C. at a draw ratio of 3×3 times. Unevenness in drawing was found on the stretched multilayer sheet.

INDUSTRIAL APPLICABILITY

The resin composition according to the embodiment of the present invention can effectively inhibit the generation of burnt deposits and the odor within the molding machine in an operation over a long time period, and produce formed products exhibiting superior appearance characteristics, retort resistance and mechanical strength. The multilayer sheet according to the embodiment of the present invention exhibits superior appearance characteristics, retort resistance and processing characteristics. The container according to the embodiment of the present invention exhibits superior appearance characteristics and retort resistance. The packaging material according to the embodiment of the present invention exhibits superior appearance characteristics, and inhibited occurrence of the unevenness in drawing. Therefore, the resin composition, the multilayer sheet, the container and the packaging material are suitable for use in boiling sterilization, retort sterilization, or the like.

The invention claimed is:

1. A resin composition comprising:
   an ethylene-vinyl alcohol copolymer (A) having an ethylene content of 20 mol % or greater and 60 mol % or less;
   a polyamide (B);
   a carboxylic acid metal salt (C); and
   a saturated carbonyl compound (D) having 3 to 8 carbon atoms,
   wherein,
   the saturated carbonyl compound (D) is a saturated aldehyde (D-1), a saturated ketone (D-2) or a combination thereof,
   a mass ratio (A/B) of the ethylene-vinyl alcohol copolymer (A) to the polyamide (B) is 60/40 or greater and 95/5 or less,
   a content of the carboxylic acid metal salt (C) expressed as a mass of a metal element with respect to a resin content is 1 ppm or greater and 500 ppm or less, and
   a content of the saturated carbonyl compound (D) with respect to the resin content is 0.01 ppm or greater and 100 ppm or less.

2. The resin composition according to claim 1, wherein the content of the carboxylic acid metal salt (C) is 5 ppm or greater.

3. The resin composition according to claim 1, wherein the metal element in the carboxylic acid metal salt (C) is magnesium, calcium, zinc or a combination thereof.

4. The resin composition according to claim 1, wherein the saturated carbonyl compound (D) is the saturated aldehyde (D-1), and the saturated aldehyde (D-1) is propanal, butanal, hexanal or a combination thereof.

5. The resin composition according to claim 1, wherein the saturated carbonyl compound (D) is the saturated ketone (D-2), and the saturated ketone (D-2) is acetone, methyl ethyl ketone, 2-hexanone or a combination thereof.

6. The resin composition according to claim 1, wherein:
   the content of the carboxylic acid metal salt (C) is 5 ppm or greater;
   the metal element in the carboxylic acid metal salt (C) is magnesium, calcium, zinc or a combination thereof;
   the saturated carbonyl compound (D) is the saturated aldehyde (D-1); and
   the saturated aldehyde (D-1) is propanal, butanal, hexanal or a combination thereof.

7. The resin composition according to claim 1, wherein:
   the content of the carboxylic acid metal salt (C) is 5 ppm or greater;
   the metal element in the carboxylic acid metal salt (C) is magnesium, calcium, zinc or a combination thereof;
   the saturated carbonyl compound (D) is the saturated ketone (D-2); and
   the saturated ketone (D-2) is acetone, methyl ethyl ketone, 2-hexanone or a combination thereof.

8. A multilayer structure comprising:
   a barrier layer formed from the resin composition according to claim 1; and
   a thermoplastic resin layer laminated on at least one face of the barrier layer.

9. A multilayer sheet comprising the multilayer structure according to claim 8.

10. The multilayer sheet according to claim 9, wherein the barrier layer and the thermoplastic resin layer are laminated by a coextrusion molding process.

11. A container which is formed from the multilayer sheet according to claim 9 by a vacuum or pressure forming process.

12. The container according to claim 11, for use in boiling sterilization or retort sterilization.

13. A packaging material which is formed from the multilayer sheet according to claim 9 by a heat-stretching process.

* * * * *